United States Patent
Shigemori

(10) Patent No.: US 6,980,499 B1
(45) Date of Patent: Dec. 27, 2005

(54) DATA RECORDING CLOCK SIGNAL GENERATOR FOR GENERATING A RECORDING CLOCK SIGNAL FOR RECORDING DATA ON A RECORDABLE MEDIUM

(75) Inventor: Toshihiro Shigemori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 924 days.

(21) Appl. No.: 09/615,837

(22) Filed: Jul. 13, 2000

(30) Foreign Application Priority Data

Jul. 22, 1999 (JP) ................................. 11-207997

(51) Int. Cl.$^7$ ........................................... G11B 7/0045
(52) U.S. Cl. ................ 369/47.28; 369/47.3; 369/59.11
(58) Field of Search .......................... 369/47.28, 59.11, 369/59.19, 47.3, 59.2

(56) References Cited

U.S. PATENT DOCUMENTS

| | | | |
|---|---|---|---|
| 5,060,214 A | 10/1991 | Nakayama et al. | |
| 5,235,576 A | 8/1993 | Shigemori | |
| 5,241,521 A | 8/1993 | Shigemori | |
| 5,377,178 A * | 12/1994 | Saito et al. ............. | 369/124.07 |
| 6,081,490 A * | 6/2000 | Kuroda et al. ........... | 369/47.28 |
| 6,088,307 A * | 7/2000 | Fushimi et al. .......... | 369/44.13 |
| 6,091,682 A * | 7/2000 | Hikima ....................... | 369/47.2 |
| 6,195,325 B1 * | 2/2001 | Okanishi ................ | 369/124.08 |
| 6,252,836 B1 * | 6/2001 | Kobayashi ............... | 369/44.34 |
| 6,469,968 B1 * | 10/2002 | Van Den Enden et al. ......................... | 369/59.12 |
| 6,522,608 B1 * | 2/2003 | Kuroda .................... | 369/47.28 |

FOREIGN PATENT DOCUMENTS

| | | |
|---|---|---|
| JP | 08-10489 | 9/1988 |
| JP | 02-295224 | 12/1990 |
| JP | 06-261224 | 9/1994 |
| JP | 07-111454 | 4/1995 |
| JP | 10-3667 | 1/1998 |
| JP | 10-69646 | 3/1998 |
| JP | 10-293926 | 11/1998 |
| JP | 11-66563 | 3/1999 |

* cited by examiner

Primary Examiner—Hoa T. Nguyen
Assistant Examiner—Michael V. Battaglia
(74) Attorney, Agent, or Firm—Dickstein Shapiro Morin & Oshinsky LLP

(57) ABSTRACT

When data recording is performed on an optical disk provided with a data recording track wobbled by a wobble signal having predetermined frequency components, a recording clock generator circuit extracts the wobble signal, generates a divided clock signal obtained by dividing the frequency of a recording clock signal at a frequency dividing rate that is set through predetermined procedures and is different from a reference frequency dividing rate, generates a phase difference signal as a result of a comparison between the phase of the wobble signal and the phase of the divided clock signal, generates a frequency control signal obtained based on the phase difference signal, and then generates a recording clock signal having a frequency controlled in accordance with the frequency control signal.

6 Claims, 13 Drawing Sheets

GROOVE PORTION   LAND PORTION   GROOVE PORTION

DATA RECORDING CLOCK SIGNAL GENERATOR FOR GENERATING A RECORDING CLOCK SIGNAL FOR RECORDING DATA ON A RECORDABLE MEDIUM

BACKGROUND OF THE INVENTION

1. Field of the Invention

The present invention relates to a data recording clock signal generator that generates a recording clock signal used for recording data on a recording medium, such as an optical disk or hard disk, in a data recording device.

2. Description of the Related Art

Known recording media having a data recording track wobbled by a wobble signal having predetermined frequency components include optical disks, such as CD-R, CD-RW, DVD-R, and DVD-RAM. Japanese Laid-Open Patent Application Nos. 10-293926 and 11-66563 each disclose a data recording clock signal generator that generates a recording clock signal synchronous with a wobble signal of an optical disk.

A rewritable optical disk has a drawback that repeated recording on the same spot makes the recording mark and its vicinity deteriorate due to thermal stress, and precise mark recording cannot be performed on that spot when a different signal is recorded. To avoid such a situation, Japanese Patent Publication No. 8-10489 and Japanese Laid-Open Patent Application No. 10-3667 disclose an optical disk recording method and an optical disk device in which the recording starting point is made variable so that the use of one particular spot is prevented, and the disk material can be used a greater number of times.

Also, Japanese Laid-Open Patent Application No. 10-69646 discloses a data recording clock signal generator that generates a recording clock signal synchronous with a wobble signal on which address information and other signals are phase-modulated and superimposed.

FIG. 1 is a block diagram showing an example structure of a conventional optical disk driving device.

An optical disk 1 has a data recording track wobbled by a wobble signal having prescribed frequency components.

FIG. 2 shows the structure of wobbled data recording track on the optical disk 1.

A land portion indicating the locations of the track is wobbled in accordance with address information, and the address information and a synchronizing signal are modulated and superimposed on the wobble signal.

In the conventional optical disk driving device shown in FIG. 1, an optical pickup (PU) 2 emits a laser beam onto a data recording track on the optical disk 1. The laser beam reflected from the track on the optical disk 1 is returned to the optical pickup 2, and is converted into an electric signal by a detector in the optical pickup 2.

An amplifier 3 amplifies the electric signal detected by the optical pickup 2 and outputs a reproducing signal RF corresponding to data recorded on the optical disk 1 and a wobble signal WBL corresponding to the wobble of the track. The reproducing signal RF is detected when the data is reproduced, and the wobble signal WBL is detected when the data is either recorded or reproduced.

A recording clock generator circuit 4 generates a recording clock signal WCLK which is synchronous with the wobble signal WBL.

FIG. 3 is a block diagram showing an example structure of the conventional recording clock generator circuit shown in FIG. 1.

The recording clock generator circuit 4 is constituted by a PLL (Phase-Locked Loop) circuit.

A phase comparator 41 compares the phase of a wobble signal WBL with the phase of a signal obtained by dividing the frequency of a recording clock signal WCLK at a predetermined frequency dividing rate by a frequency divider 45.

The output of the phase comparator 41 is converted into a voltage signal by a charge pump 42, smoothed by a filter 43, and then inputted into a VCO (Voltage Controlled Oscillator).

The frequency of the output clock of the VCO, which is the recording clock signal WCLK, is controlled by an input voltage. As a result, the phase of the recording clock signal WCLK becomes synchronous with the wobble signal WBL.

Now referring back to FIG. 1, a synchronous detector circuit 5 and an address decoder 6 of the conventional optical disk driving device detect the synchronizing signal and the address information, respectively, superimposed on the wobble signal.

When data recording is carried out, a data encoder 8 synchronizes with the recording clock signal WCLK to perform a predetermined modulation process on the recording data.

An LD driver 9 modulates the strength of laser beams emitted from the optical pickup 2 in accordance with the modulated recording data. As a result, the data recording can be carried out in synchronization with the wobble signal of the data recording track.

According to the technique disclosed in Japanese Patent Publication NO. 8-10489, however, a plurality of analog delay circuits are required for obtaining random recording starting points, resulting in higher production costs.

In the conventional recording clock generating circuit, the phase of the recording clock signal WCLK is constantly synchronous with the wobble signal WBL, as long as the wobble signal is properly detected. However, minor defects might exist on the optical disk, or dirt or dust might stick to the surface of the optical disk. At the locations corresponding to those defects or the areas to which dirt or dust sticks, the wobble signal is lost, and cannot be detected properly.

In the recording clock generating circuit constituted by the conventional PLL circuit, a small loss of the wobble signal can be ignored, and the phase synchronization between the wobble signal and the recording clock signal can be maintained thanks to a so-called flywheel effect of the PLL. However, if there is a large loss of the wobble signal, a phase shift is caused between the wobble signal and the recording clock signal. After the loss, the phase of the recording clock signal is shifted by a whole number of cycles of the wobble signal. This situation is called a bit slip.

When there is a bit slip in the recording clock signal, the phase difference between the wobble signal and the recording clock signal cannot be compensated, and data recording is performed at locations deviated from predetermined locations. If new data recording is started after data recording is completed in one sector, with a bit slip remaining in the recording clock signal, data overlapping or unnecessary blank is caused at the connecting portions between the previous recording data and the new recording data. In such a situation, the data recorded in the vicinity of the connecting portion is not properly reproduced.

In the case where address information and other signals are phase-modulated and then superimposed on a wobble signal on an optical disk (as disclosed in Japanese Laid-Open Patent Application No. 10-69646, for instance), a drastic change occurs in the phase of the wobble signal due to the phase modulation, and a phase shift is caused between the wobble signal and the recording clock signal.

SUMMARY OF THE INVENTION

It is a general object of the present invention to provide a data recording clock signal generator in which the above-mentioned problems are eliminated.

A first specific object of the present invention is to provide a recording clock generating circuit with which the recording starting point can be made variable without the use of analog delay circuits, and which can be produced at a lower cost.

A second specific object of the present invention is to provide a recording clock generating circuit which can restore recording data at a predetermined location by compensating a phase shift between a wobble signal and a recording clock signal when a bit slip occurs in the recording clock signal due to a loss of the wobble signal.

A third specific object of the present invention is to provide a recording clock generating circuit that generates a recording clock stably synchronous with a wobble signal even in a case where address information and other signals are phase-modulated and superimposed on the wobble signal on an optical disk.

The first specific object of the present invention is achieved by a data recording clock signal generator that generates a recording clock signal synchronous with a wobble signal used for recording data on an optical disk having a data recording track wobbled by the wobble signal having predetermined frequency components. This data recording clock signal generator comprises:
 a wobble signal extracting unit that extracts the wobble signal;
 a recording clock signal dividing unit that generates a divided clock signal obtained by dividing the frequency of the recording clock signal;
 a phase difference signal generating unit that generates a phase difference signal as a result of a phase comparison between the wobble signal and the divided clock signal;
 a frequency control signal generating unit that generates a frequency control signal based on the phase difference signal generated by the phase difference signal generating unit; and
 a recording clock signal generating unit that generates the recording clock signal having a frequency controlled in accordance with the frequency control signal generated by the frequency control signal generating unit.

In this data recording clock signal generator, the recording clock signal dividing unit includes a frequency dividing rate setting unit that sets a reference frequency dividing rate and a frequency dividing rate different from the reference frequency dividing rate, following predetermined procedures.

With the above data recording clock signal generator, the phase relationship between the wobble signal and the recording clock signal is varied with the frequency dividing condition setting value, so that the phase relationship between the wobble signal and the recording clock signal can be changed by a smaller unit than one cycle of the recording clock signal.

In the above data recording clock signal generator, the frequency dividing rate setting unit is further provided with a rate selecting unit that changes the order of combinations of the reference frequency dividing rate and the different frequency dividing rate every time data recording is performed on the optical disk.

Since the frequency dividing setting value is randomly selected every time data recording is performed on the optical disk, the phase relationship between the wobble signal and the recording clock signal is randomly varied, thereby preventing repeated use of the same spot on the disk material. Accordingly, the disk material can be repeatedly used a greater number of times. Furthermore, since the recording starting point can be randomly changed without the use of analog delay circuits, the optical disk driving device can be produced at a lower cost.

The second specific object of the present invention is achieved by the above data recording clock signal generator, which further comprises:
 a synchronous detection unit that detects a synchronizing signal superimposed on the wobble signal;
 a synchronous relationship judgment unit that judges the synchronous relationship between the detected synchronizing signal and recording data to be recorded on the optical disk; and
 a control unit that controls the average value of the frequency dividing rate set in the recording clock dividing unit to be greater than the reference frequency dividing rate when the synchronous relationship judgment unit judges that the recording data lags behind the detected synchronizing signal, and also controls the average value of the frequency dividing rate to be smaller than the reference frequency dividing rate when the synchronous relationship judgment unit judges that the recording data is ahead of the detected synchronizing signal.

With the data recording clock signal generator, the recording clock signal can restore the recording data at a predetermined location by compensating the phase shift between the wobble signal and the recording clock signal even when a bit slip occurs in the recording clock signal due to a loss of the wobble signal.

The third specific object of the present invention is achieved by a data recording click signal generator that generates a recording clock signal synchronous with the wobble signal used for recording data on an optical disk having a data recording track wobbled by the wobble signal, which has predetermined frequency components, and on which address information and a synchronizing signal are phase-modulated and superimposed. This data recording clock signal generator comprises:
 a wobble signal extracting unit that extracts the wobble signal;
 a recording clock signal dividing unit that generates a divided clock signal obtained by dividing the frequency of the recording clock signal;
 a phase difference signal generating unit that generates a phase difference signal as a result of a phase comparison between the wobble signal and the divided clock signal;
 a frequency control signal generating unit that generates a frequency control signal based on the phase difference signal generated by the phase difference signal generating unit;
 a recording clock signal generating unit that generates the recording clock signal having a frequency controlled in accordance with the frequency control signal generated by the frequency control signal generating unit; and
 a masking unit that prevents the phase difference signal generating unit from generating the phase difference signal at any timing close to the timing when either the address information or the synchronizing signal is phase-modulated on the optical disk.

With this data recording clock signal generator, the operation of the phase comparator is masked in a region where a drastic change occurs in the phase of the wobble signal due to phase modulation. Accordingly, no phase shift occurs between the wobble signal and the recording clock signal, and a recording clock signal stably synchronous with the wobble signal can be generated.

The above objects of the present invention are also achieved by a data recording clock signal generator that generates a recording clock signal synchronous with a wobble signal used for recording data on an optical disk having a data recording track wobbled by the wobble signal having predetermined frequency components. This data recording clock signal generator comprises:

a wobble signal extracting unit that extracts the wobble signal;

a recording clock signal dividing unit that generates a divided clock signal obtained by dividing the frequency of the recording clock signal;

a phase difference signal generating unit that generates a phase difference signal as a result of a phase comparison between the wobble signal and the divided clock signal;

a first frequency control signal generating unit that generates a first frequency control signal based on the phase difference signal generated by the phase difference signal generating unit;

a wobble signal dividing unit that divides the frequency of the wobble signal at a predetermined frequency dividing rate;

a wobble signal cycle counting unit that counts cycles of the divided wobble signal by the cycle of the recording clock signal;

a second frequency control signal generating unit that generates a second frequency control signal based on the number of cycles counted by the wobble signal cycle counting unit; and a recording clock signal generating unit that generates the recording clock signal having a frequency controlled in accordance with the first frequency control signal when the number of cycles counted by the wobble signal cycle counting unit is within a predetermined range, and generates the recording clock signal having a frequency controlled in accordance with the second frequency control signal when the number of cycles counted by the wobble signal cycle counting unit is outside the predetermined range.

With this data recording clock signal generator, prompt locking in the PLL can be carried out even if the relationship between the frequency of the wobble signal and the frequency of the recording clock signal is outside the capture range.

In the above data recording clock signal generator, the recording clock signal generating unit may generate the recording clock signal having the frequency controlled in accordance with the first frequency control signal when the number of cycles counted by the wobble signal cycle counting unit is within the predetermined range, and generate the recording clock signal having the frequency controlled in accordance with the second frequency control signal when the number of cycles counted by the wobble signal cycle counting unit is determined to be outside the predetermined range a predetermined consecutive number of times.

With this data recording clock signal generator, prompt locking in the PLL can be carried out even if the relationship between the frequency of the wobble signal and the frequency of the recording lock signal is outside the capture range. Also, an unnecessary leading-in operation can be avoided while phase locking is carried out in the PLL.

Other objects and further features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
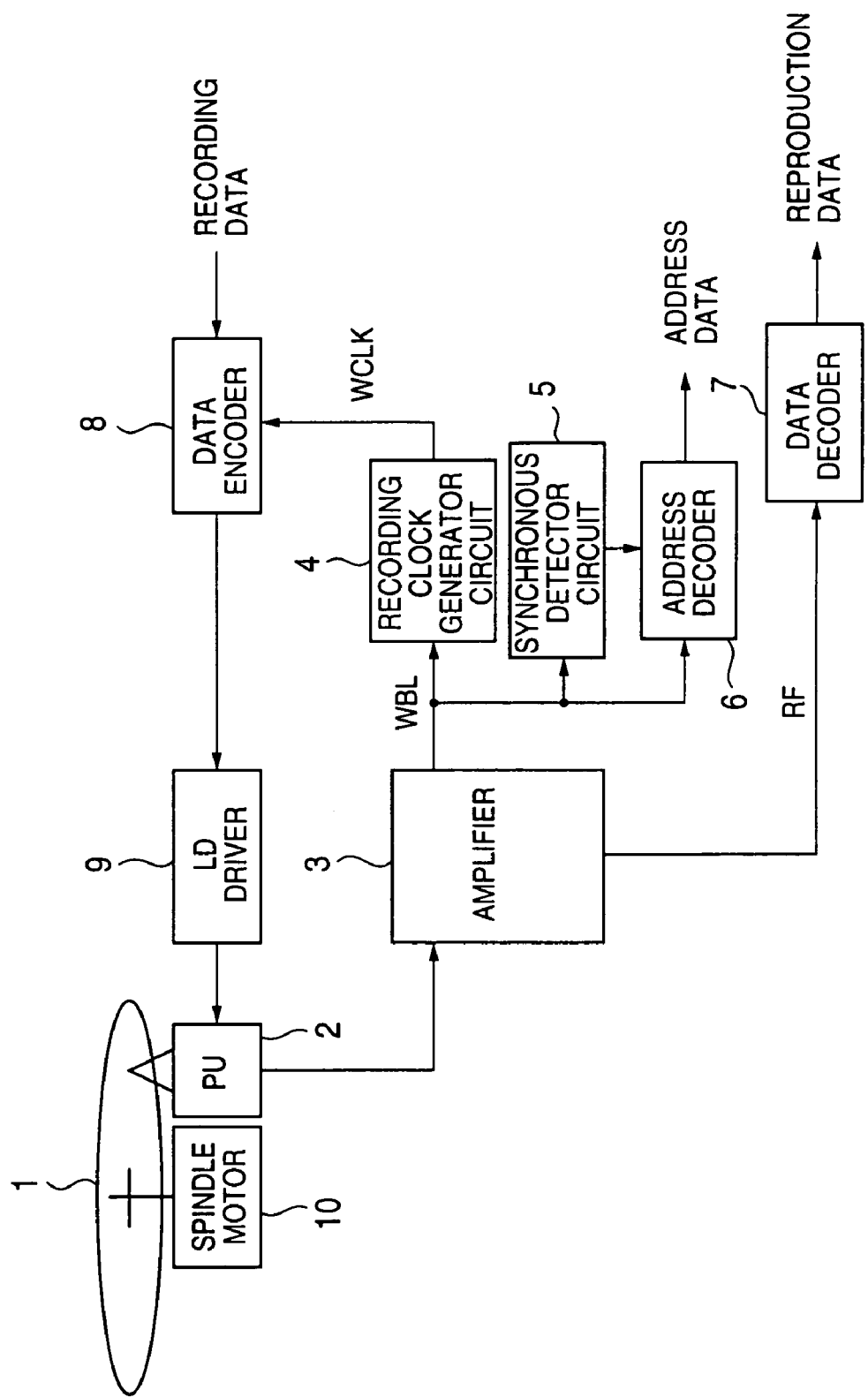
FIG. 1 is a block diagram showing an example structure of a conventional optical disk driving device.
Figure 2:
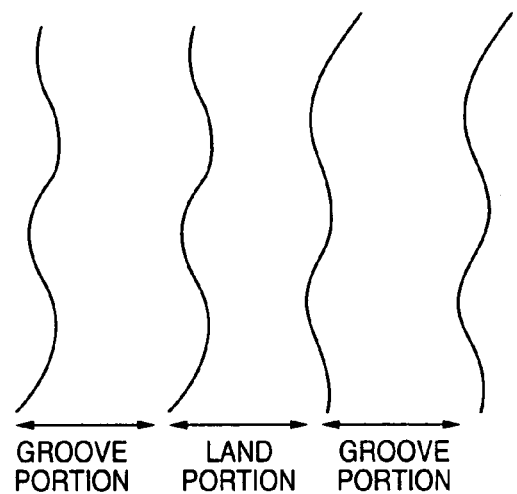
FIG. 2 illustrates an example structure of a wobbled data recording track on an optical disk.
Figure 4:
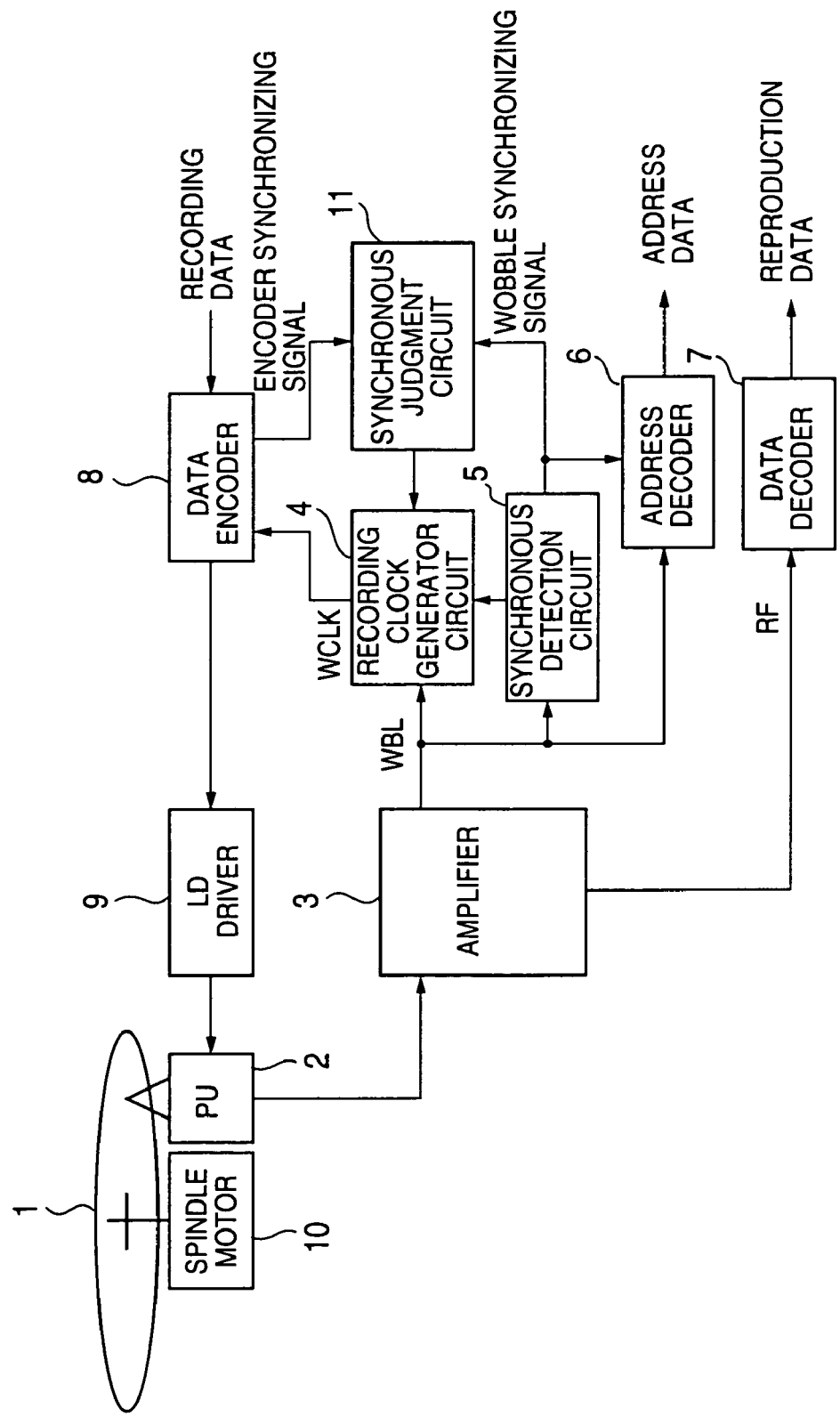
FIG. 4 is a block diagram showing an example structure of an optical disk driving device in accordance with a first embodiment of the present invention.

FIG. 4 is a block diagram showing an example structure of an optical disk driving device in accordance with a first embodiment of the present invention. In FIG. 4, the same components as in the optical disk driving device shown in FIG. 1 are denoted by the same reference numerals.

A recording clock generator circuit 4 of this optical disk driving device is a data recording clock signal generator that generates a recording clock signal synchronous with a wobble signal used in data recording on an optical disk having a data recording track wobbled by the wobble signal that has prescribed frequency components.

Figure 3:
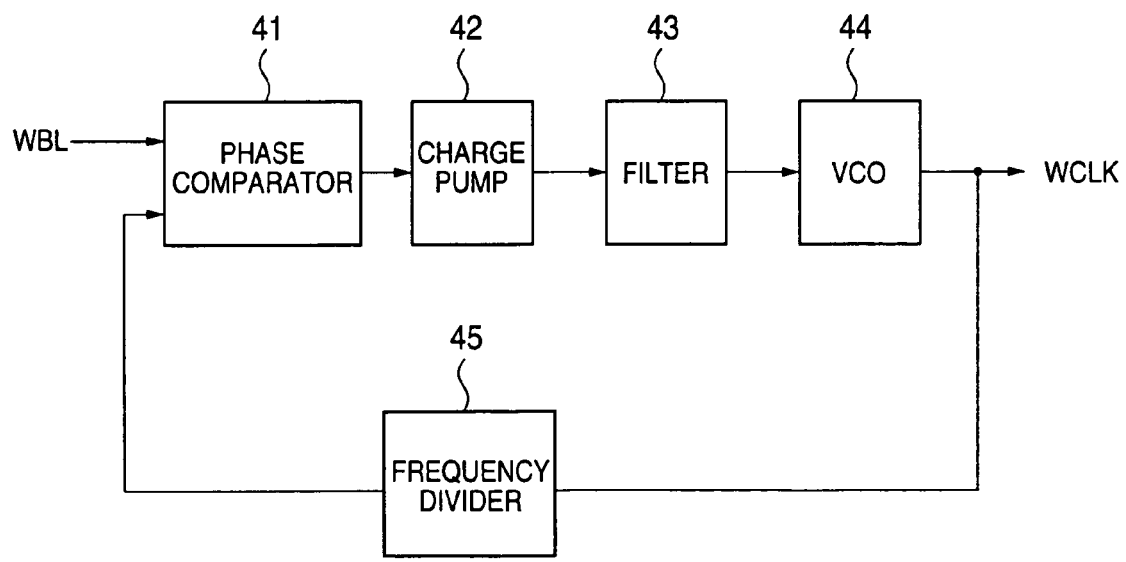
FIG. 3 is a block diagram showing an example structure of a conventional recording clock generator circuit.
Figure 5:
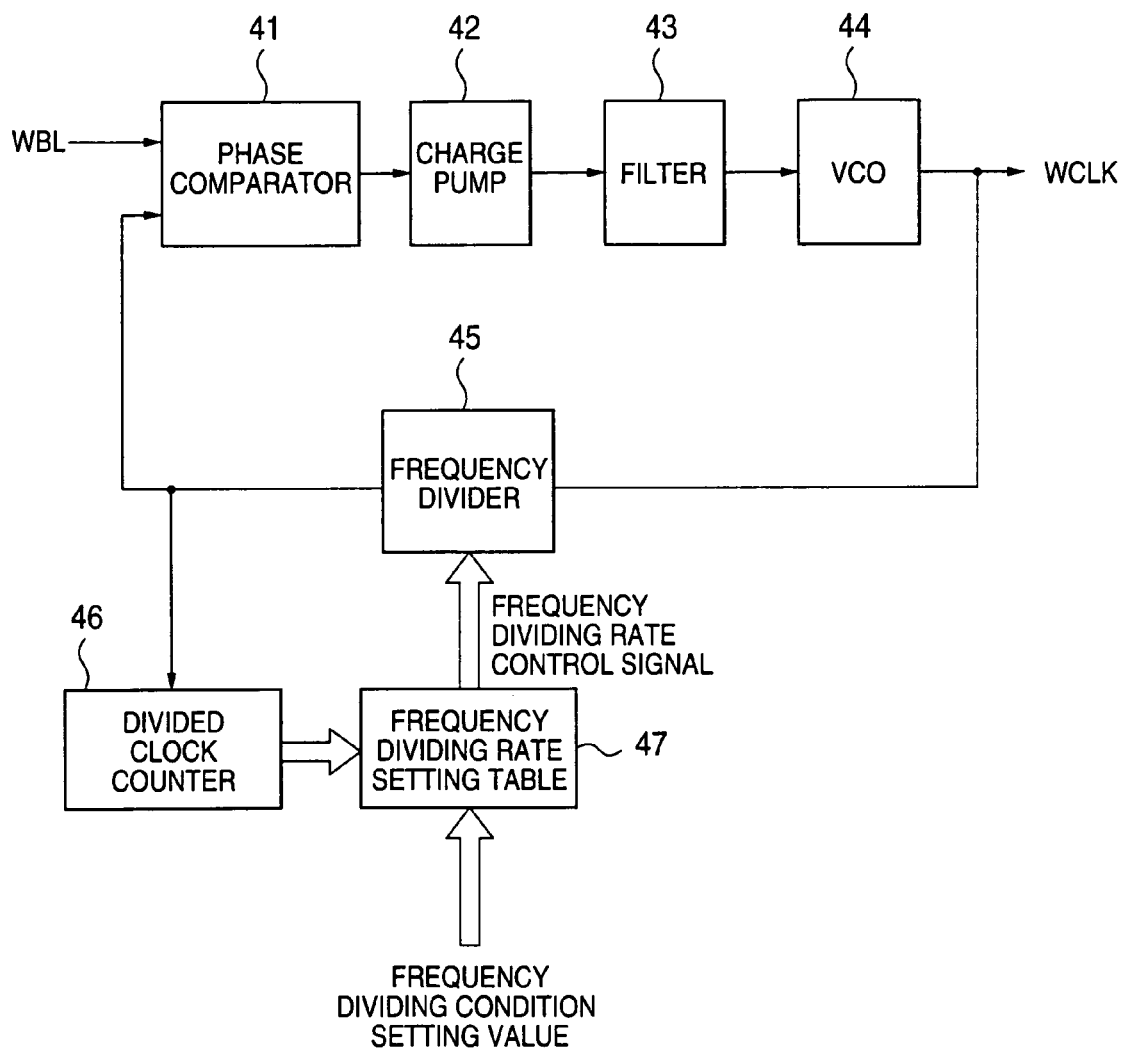
FIG. 5 is a block diagram showing an example inner structure of the recording clock generator circuit shown in FIG. 4.

FIG. 5 is a block diagram showing an example inner structure of the recording clock generator circuit 4 shown in FIG. 4. In FIG. 5, the same components as in FIG. 3 are denoted by the same reference numerals.

The recording clock generator circuit 4 is constituted by a so-called PLL (Phase Locked Loop) circuit, and generates a recording clock signal WCLK synchronous with a wobble signal WBL.

A frequency divider 45 outputs a divided clock signal obtained by dividing the frequency of the recording clock signal WCLK in accordance with a frequency dividing rate control signal outputted from a frequency dividing rate setting table 47. The divided clock signal is returned to a phase comparator 41, and is also inputted into a divided clock counter 46.

The divided clock counter 46 changes a count value at each edge of the divided clock signal. The frequency dividing rate setting table 47 outputs the frequency dividing rate control signal to the frequency divider 45 in accordance with the count value and a frequency dividing condition setting value of the divided clock counter 46.

Figure 6:
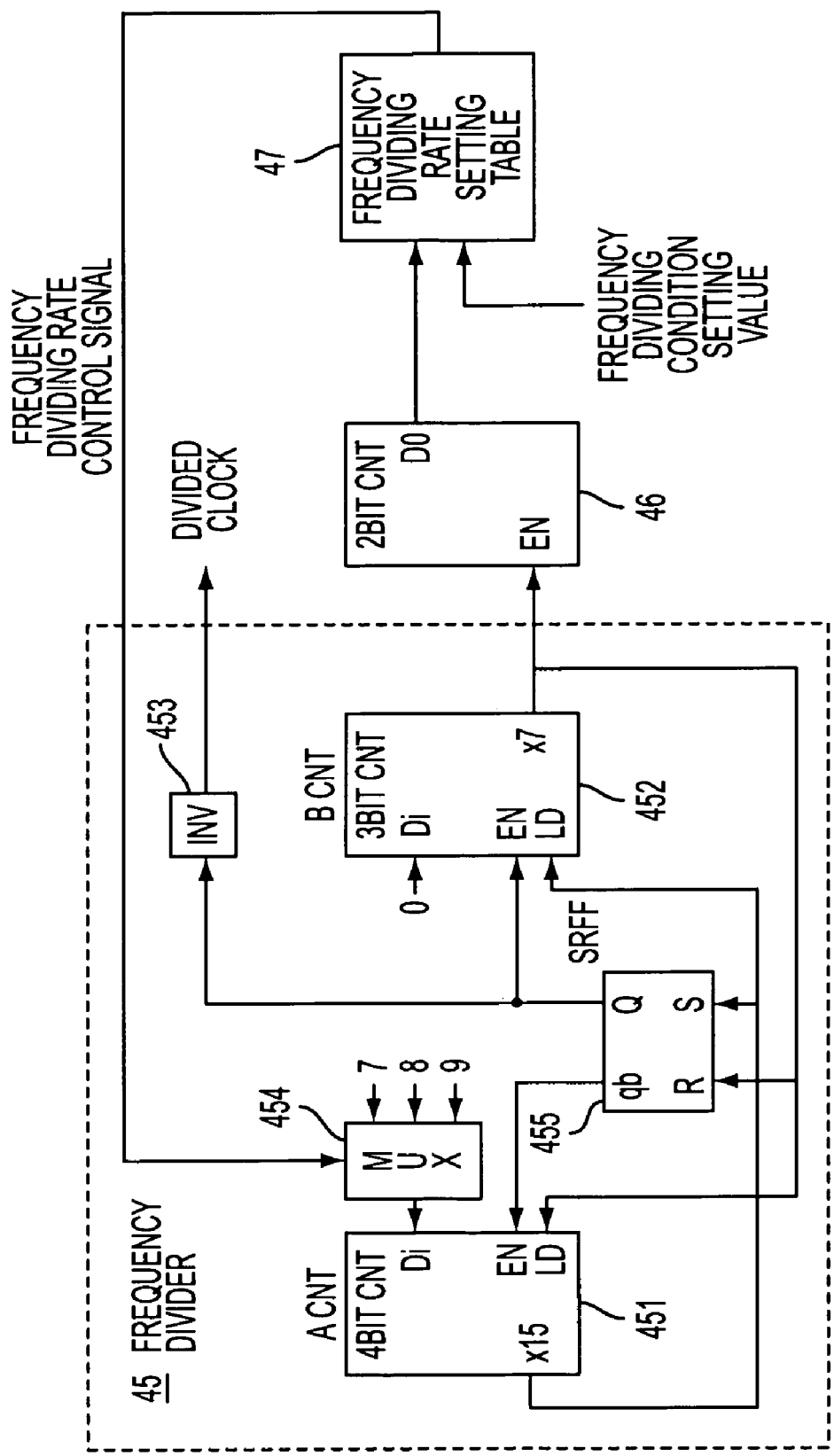
FIG. 6 is a block diagram showing an example structure of a frequency divider, a divided clock counter, and a dividing rate setting table shown in FIG. 5.

FIG. 6 is a block diagram showing an example structure of the frequency divider 45, the divided clock counter 46, and the frequency dividing rate setting table 47.

The divided clock counter 46 is constituted by a 2-bit counter.

The frequency divider 45 is constituted by a counter A 451 that is a 4-bit counter, a counter B 452 that is a 3-bit counter, a synchronous SRFF (Set-Reset Flip-Flop) 455, an inverter 453, and a multiplexer 454 having 3 inputs and one output.

The recording clock signal. WCLK (not shown in FIG. 6) is inputted into the counter A 451, the counter B 452, and the synchronous SRFF 455. One cycle of the recording clock signal will be hereinafter referred to as "1T".

Outputs Qb and Q of the synchronous SRFF are inputted into count enable inputs of the counter A 451 and the counter B 452, respectively.

A full-count output (=15) of the counter A 451, which is a signal indicating that the maximum value of the count value of the counter A 451 is "15", is inputted into an input S of the synchronous SRFF 455.

A full-count output (=7) of the counter B 452, which is a signal indicating that the maximum value of the count value of the counter B 452 is "7", is inputted into an input R of the synchronous SRFF 455.

The full-count output (=15) of the counter A 451 is also inputted into a load input LD of the counter B 452. The full-count output (=7) of the counter B 452 is also inputted into a load input LD of the counter A 451.

A value selected from values "7", "8", and "9" by the multiplexer 454 is inputted into a data input Di of the counter A 451. When the load input LD becomes active (i.e., the load input LD is "1"), the count value of the counter A 451 is set at "7", "8", or "9".

The value "0" is inputted into a data input Di of the counter B 452. When the load input LD becomes active, the count value of the counter B 452 is set at "0".

In the following, an operation of the frequency divider 45 will be described in detail.

The counter A 451 and the counter B 452 carry out a count operation alternately.

The counter A 451 carries out a count operation, starting from an initial value of "7", "8", or "9" selected by the multiplexer 454 until the final value "15". In other words, the counter A 451 counts 7T, 8T, or 9T in one count operation.

The counter B 452 carries out a count operation, starting from the initial value "0" until the final value "7". In other words, the counter B 452 counts 8T in one count operation.

The divided clock is a signal obtained by inverting the output Q of the synchronous SRFF 455 by the inverter 453. Accordingly, the operation of one cycle of the divided clock is the combination of one count operation of the counter A 451 and one count operation of the counter B 452, is equivalent to 15T, 16T, or 17T.

In view of this, the reference frequency dividing rate of the frequency divider 45 is "16", which is allowed to have a variation of ±1.

The full-count output (=7) of the counter B 452 is inputted into a count enable input EN of the divided clock counter 46. Accordingly, the divided clock counter 46 adds "1" to the count value every time an operation of one cycle of the divided clock that is equivalent to the combination of one count operation of the counter A 451 and one count operation of the counter B 452 is completed.

Since the divided clock counter 46 is a 2-bit counter in this embodiment, the count value of the divided clock counter 46 is "0", "1", "2", or "3".

The divided clock counter 46 inputs 2-bit count data from the divided clock counter 46 and 2-bit data as the frequency dividing condition setting value are inputted into the frequency dividing rate setting table 47. The frequency dividing rate setting table 47 outputs a frequency dividing rate control signal in accordance with a truth table shown in Table 1, based on the count value of the divided clock counter 46 and the frequency dividing condition setting value.

TABLE 1

| Frequency dividing Condition setting Value | divided clock counter value | Sel 7 | Sel 8 | Sel 9 |
|---|---|---|---|---|
| 0 | 0 | 0 | 1 | 0 |
|   | 1 | 0 | 1 | 0 |
|   | 2 | 0 | 1 | 0 |
|   | 3 | 0 | 1 | 0 |
| 1 | 0 | 0 | 0 | 1 |
|   | 1 | 0 | 1 | 0 |
|   | 2 | 0 | 1 | 0 |
|   | 3 | 1 | 0 | 0 |
| 2 | 0 | 0 | 0 | 1 |
|   | 1 | 1 | 0 | 0 |
|   | 2 | 0 | 0 | 1 |
|   | 3 | 1 | 0 | 0 |
| 3 | 0 | 0 | 1 | 0 |
|   | 1 | 0 | 1 | 0 |
|   | 2 | 0 | 0 | 1 |
|   | 3 | 1 | 0 | 0 |

The frequency dividing rate control signal of the frequency dividing rate setting table 47 is inputted into the multiplexer 454, and the initial value of the counter A 451 is selected in accordance with the frequency dividing rate control signal.

When the frequency dividing rate control signal Sel7 is active (i.e., "Sel7" is "1"), the multiplexer 454 selects the value "7". When the frequency dividing rate control signal Sel8 is active (i.e., "Sel8" is "1"), the multiplexer 454 selects the value "8". When the frequency dividing rate control signal Sel9 is active (i.e., "Sel9" is "1"), the multiplexer 454 selects the value "9".

Figure 7:
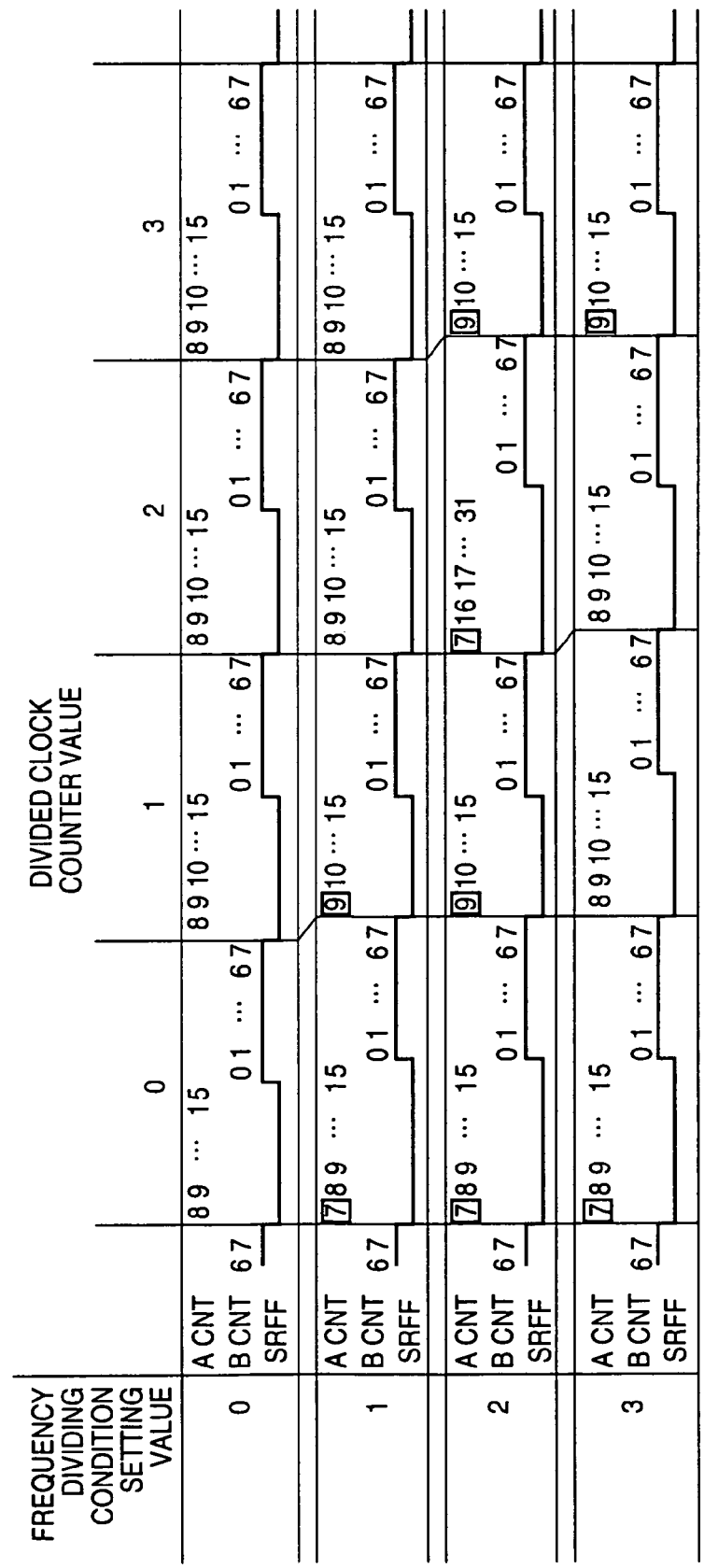
FIG. 7 is a four-stage timing chart of an operation of the frequency divider.
Figure 8:
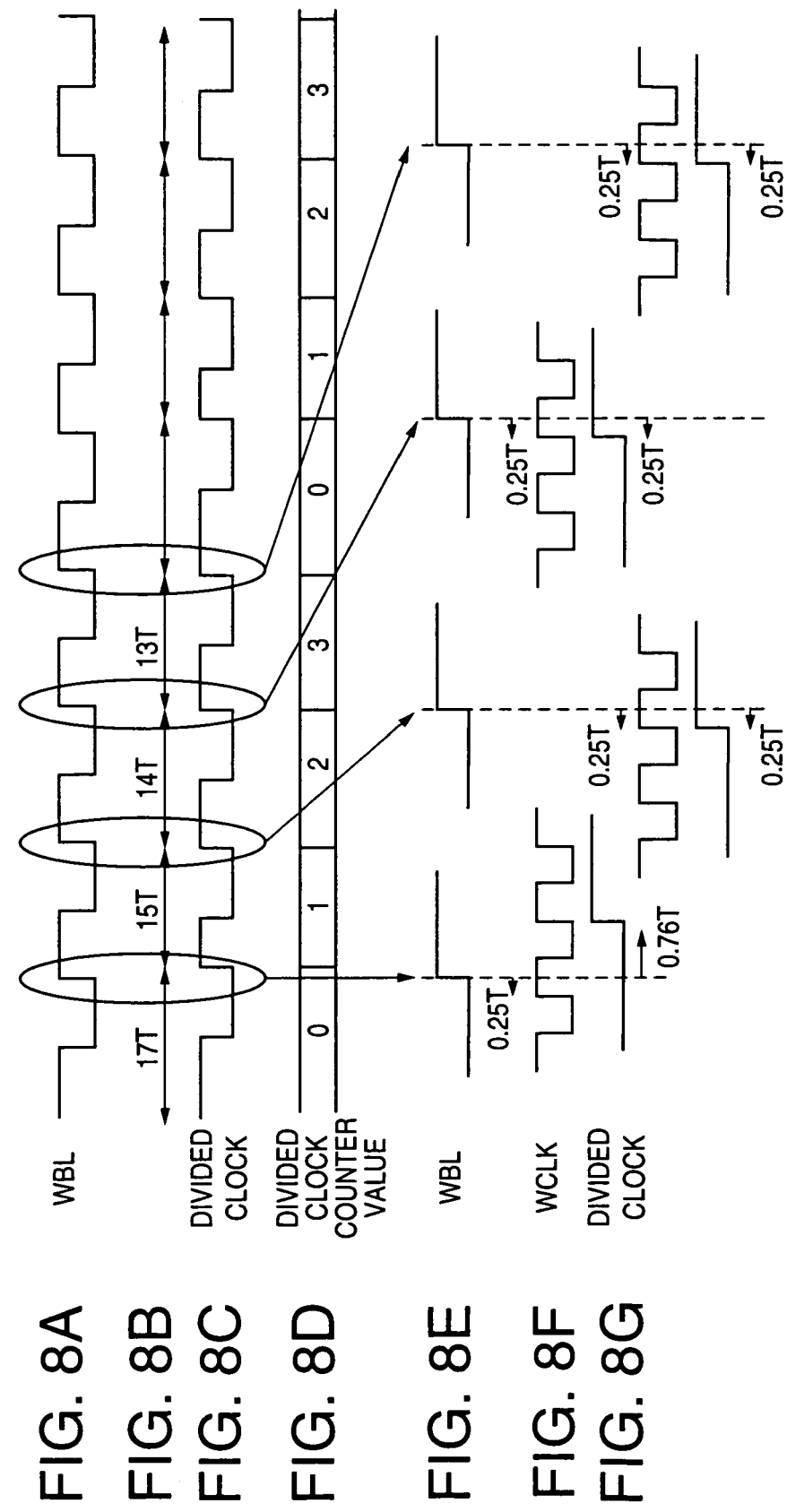
FIGS. 8A to 8G are timing charts of a wobble signal, a recording clock signal, and a divided clock signal in a locked steady state where a frequency dividing condition setting value is "1"

FIG. 7 is a four-stage timing chart of the operation of the frequency divider 45. Referring to the four-stage timing chart, the operation of the frequency divider 45 will be described below in detail.

In the four-stage timing chart of FIG. 7, the top timing chart is an operation timing chart in the case where the frequency dividing condition setting value is "0". The second timing chart from the top is an operation timing chart in the case where the frequency dividing condition setting value is "1". The second timing chart from the bottom is an operation timing chart in the case where the frequency dividing condition setting value is "2". The bottom timing chart is an operation timing chart in the case where the frequency dividing condition setting value is "3".

In the horizontal direction of FIG. 7, the count value of the divided clock counter changes from "0" to "3". After the operation in the case where the count value of the divided clock counter is "3" is completed, the count value of the divided clock counter returns to "0".

First, the operation in the case where the frequency dividing condition setting value is "0"will be described below.

In accordance with the truth table of Table 1, when the frequency dividing condition setting value is "0", the frequency dividing rate setting table 47 makes only the frequency dividing rate control signal Sel8 active, regardless of the count value of the divided clock counter 46.

Accordingly, the initial value of the counter A 451 is set at "7" at the start of each divided clock cycle. Thus, the count operation by the counter A 451 is equivalent to 8T in every divided clock cycle, and one cycle of the divided clock is equivalent to 16T.

Next, the operation in the case where the frequency dividing condition setting value is "1" will be described.

The initial value of the counter A 451 in the divided clock cycle in which the counter value of the divided clock counter 46 is "0" is determined by the output of the multiplexer 454 in the immediately previous divided clock cycle in which the count value of the divided clock counter 46 is "3".

In accordance with the truth table of Table 1, when the frequency dividing condition setting value is "1" and the divided clock counter value is "3", the frequency dividing rate control signal Sel7 is active. Accordingly, in the divided clock cycle in which the count value of the divided clock counter 46 is "0", the initial value of the counter A 451 is "7". As a result, the count operation of the counter A 451 in the divided clock cycle in which the count value of the divided clock counter 46 is "0" becomes equivalent to 9T, and the divided clock cycle becomes equivalent to 17T.

Likewise, the divided clock cycle in which the count value of the divided clock counter 46 is "1" is equivalent to 15T.

The divided clock cycle in which the count value of the divided clock counter 46 is "2" is equivalent to 16T.

The divided clock cycle in which the count value of the divided clock counter 46 is "3" is equivalent to 16T.

When the frequency dividing condition setting value is 1, the number of recording clock cycles in one divided clock cycle is not constant but repeats the pattern, "17T 15T 16T 16T, 17T 15T 16T 16T, . . . ".

Likewise, when the frequency dividing condition setting value is "2", the number of recording clock cycles in one divided clock cycle repeats the pattern, "17T 15T 17T 15T, 17T 15T 17T 15T, . . . ".

When the frequency dividing condition setting value is "3", the number of recording clock cycles in one divided clock cycle repeats the pattern, "17T 16T 16T 15T, 17T 16T 16T 15T, . . . ".

The number of recording clock cycles in one divided clock cycle is changed as above, the phase of the divided clock varies in the following manner.

When the frequency dividing condition setting value is "0", the recording clock cycles in one divided clock cycle is constantly 16T, which is the reference frequency dividing rate as already mentioned.

The phase comparator 41 picks up the phase of the leading edge of each divided clock signal. Since the divided clock is obtained by inverting the output Q of the synchronous SRFF 455, the phase of the trailing edge of each output Q of the synchronous SRFF 455 is marked in FIG. 7.

When the frequency dividing condition setting value is "1", the divided clock cycle in which the count value of the divided clock counter 46 is "0" is equivalent to 17T. Accordingly, the phase of the trailing edge of the output Q of the synchronous SRFF 455 is delayed by 1T with respect to the reference phase of the divided clock.

Since the divided clock cycle in which the count value of the divided clock counter 46 is "1" is equivalent to 15T, the phase of the trailing edge of the output Q of the synchronous SRFF 455 compensates the phase lag of the immediately previous cycle, and coincides with the reference phase of the divided clock.

Also, since the divided clock cycle in which the count value of the divided clock counter 46 is "2" or "3" is equivalent to 16T, the phase of the trailing edge of the output Q of the synchronous SRFF 455 coincides with the reference phase of the divided clock.

Accordingly, when the frequency dividing condition setting value is "1", the phase of the divided clock repeats the pattern, "1T behind coincident coincident coincident . . . " with respect to the reference phase of the divided clock.

Likewise, when the frequency dividing condition setting value is "2", the phase of the divided clock repeats the pattern, "1T behind coincident 1T behind coincident . . . " with respect to the reference phase of the divided clock.

When the frequency dividing condition setting value is "3", the phase of the divided clock repeats the pattern, "1T behind 1T behind 1T behind coincident . . . "with respect to the reference phase of the divided clock.

Referring now to FIGS. 8A to 8G, the relationship between the phase of the wobble signal WBL and the phase of the recording clock signal WCLK in a case where the phase of the divided clock is varied in the above manner will be described below.

The operating time constant of the PLL circuit is generally a cycle longer than a phase comparison cycle. Even if the phase of the divided clock is varied as above, the frequency of the recording clock signal is maintained at a substantially constant value, thereby achieving a locked state in which the average phase of the divided clock signal coincides with the phase of the wobble signal in the steady state.

FIGS. 8A to 8G are timing charts of the wobble signal WBL, the recording clock signal WCLK, and the divided clock signal in the locked steady state where the frequency dividing condition setting value is "1".

FIGS. 8A to 8D show the relationship among the wobble signal WBL, the divided clock signal, and the count value of the divided clock counter 46. FIGS. 8E to 8G show the relationship among the wobble signal WBL, the recording clock signal WCLK, and the divided clock signal, with enlarged views of rising edges on which phase comparison is carried out.

As described above, the average phase of the divided clock signal in the locked steady state coincides with the phase of the wobble signal. Accordingly, the phase of the divided clock with respect to the wobble signal repeats the cycle, "0.75T behind 0.25T ahead 0.25T ahead 0.25T ahead, . . . ".

Since only the phase of the divided clock is delayed by 1T with respect to the reference phase of the divided clock when the count value of the divided clock counter 46 in the case where the frequency dividing condition setting value is "1", the reference phase of the divided clock is always 0.25T ahead of the phase of the wobble signal. In other words, the phase of the recording clock signal is always 0.25T ahead of the phase of the wobble signal.

Likewise, when the frequency dividing condition setting value is "2" or "3", the phase of the recording clock signal is 0.5T or 0.75T ahead of the phase of the wobble signal, though not shown in the drawings.

In the above manner, the recording clock generator circuit 4 of this embodiment can change the relationship between the wobble signal and the recording clock signal in the range from 0T to 0.75T, 0.25T at a time, in accordance with the frequency dividing condition setting value of "0" to "3".

Referring now to a timing chart of FIG. 9, a control operation for greatly changing the relationship between the wobble signal and the recording clock signal will be described below.

Figure 9:
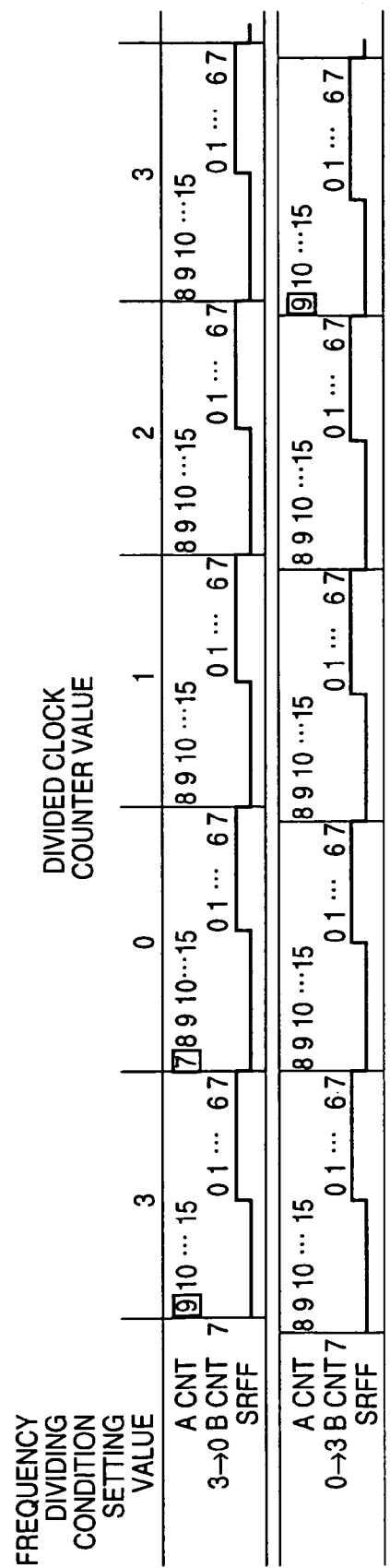
FIG. 9 shows timing charts of various signals in a case where the relationship between the phase of the wobble signal and the phase of the recording clock signal is greatly changed.

On the upper half of FIG. 9, an operation timing chart of the frequency divider 45 in the case where the frequency dividing condition setting value is varied from "3" to "0". Here, the timing of changing the frequency dividing condition value from "3" to "0"should coincide with the timing of changing the count value of the divided clock counter 46 from "3" to "0".

As mentioned before, when the frequency dividing condition setting value is "3", the divided clock cycle in which the count value of the divided clock counter 46 is "3", is equivalent to 15T.

Also, when the frequency dividing condition setting value is "0", the divided clock cycle in which the count value of the divided clock counter 46 is "0" is equivalent to 17T, because the initial value of the counter A451 is determined when the frequency dividing value is "3" and the count value of the divided clock counter 46 is "3".

While the frequency dividing condition setting value is "0" the divided clock cycle in which the count value of the divided clock counter 46 is "1", "2", or "3" is equivalent to 16T, as mentioned before.

More specifically, in the divided clock cycle immediately after the frequency dividing condition setting value is changed from "3" to "0", an advance phase shift of 1T occurs, and this phase shift remains in the following divided clock cycles, unlike in divided clock cycles in which the frequency dividing condition setting value remains "0".

When the frequency dividing condition setting value is changed from "3", with the phase of the recording clock signal is 0.75T ahead of the wobble signal, to "0", the phase of the recording clock signal shifts 1T ahead of the wobble signal. When the frequency dividing condition setting value is further changed in the order of "1 2 3", the phase of the recording clock signal shifts "1.25T 1.5T 1.75T" ahead of the wobble signal in the steady state.

The lower half of FIG. 9 shows a timing chart of the operation of the frequency divider in a case where the frequency dividing condition setting value is changed from "0" to "3". Here, the timing for changing the frequency dividing condition setting value from "0" to "3" coincides with the timing for changing the count value of the divided clock counter 46 from "3" to "0".

As mentioned before, when the frequency dividing setting value is "0", the divided clock cycle in which the count value of the divided clock counter 46 is equivalent to 16T.

When the frequency dividing setting value is "3", the divided clock cycle in which the count value of the divided clock counter 46 is "0"is equivalent to 16T, because the initial value of the counter A 451 is determined when the frequency dividing condition setting value is "0" and the count value of the divided clock counter 46 is "3".

While the frequency dividing condition setting value is "3", the divided clock cycle in which the count value of the divided clock counter 46 is "1", "2", or "3" is equivalent to 16T, 16T, or 15T, respectively.

More specifically, in the divided clock cycle immediately after the frequency dividing condition value is changed from "0" to "3", a delay phase shift of 1T occurs, and this phase shift remains in the following divided clock cycles, unlike in divided clock cycles in which the frequency dividing condition setting value remains "3".

When the frequency dividing condition setting value is changed from "0", with the phase of the recording clock signal being coincident with the wobble signal, to "3", the phase of the recording clock signal shifts 0.25T behind the wobble signal. When the frequency dividing condition setting value is further changed in the order of "2 1 0", the phase of the recording clock signal shifts "0.25T 0.5T 0.75T" behind the wobble signal in the steady state.

In the above manner, the recording clock generator circuit of this embodiment can change the relationship between the wobble signal and the phase of the recording clock signal from 0T to 0.75T, 0.25T at a time, depending on the frequency dividing condition setting value in the range of "0" to "3". Furthermore, the recording clock generator circuit of this embodiment can flexibly change the relationship between the wobble signal and the phase of the recording clock signal, 0.25T at a time, by increasing the frequency dividing condition setting value in a binary-counter fashion, "3 0 1 2 3, . . . ", or decreasing the frequency dividing condition setting value in the order of "0 3 2 1 0, . . . ".

In the recording clock generator circuit of this embodiment, the count length of the divided clock counter 46 is "4", and the repeating cycle of the frequency dividing rate variation of the frequency divider 45 is "4". Accordingly, the relationship between the phase of the wobble signal and the phase of the recording clock signal is changed 0.25T at a time. However, the count length and the repeating cycle of the frequency dividing rate variation can be made greater, so that the relationship between the phase of the wobble signal and the phase of the recording clock signal can be changed a smaller amount at a time.

Next, a recording clock generator circuit in accordance with a second embodiment of the present invention will now be described.

This recording clock generator circuit of the second embodiment has substantially the same structure as shown in FIGS. 5 and 6, and is used as the recording clock generator circuit 4 in the optical disk driving device shown in FIG. 4. However, the functions of the recording clock generator circuit of this embodiment differ from those of the recording clock generator circuit of the first embodiment.

The recording clock generator circuit 4 generates randomly selects a frequency dividing condition setting value by a controller (not shown) every time data is recorded on the optical disk 1. Accordingly, the relationship between the phase of the wobble signal and the phase of the recording clock signal randomly changes every time data recording is performed on the optical disk 1, so that repeated use of the same recording area on the optical disk can be prevented. Thus, wear of the disk material can be evened and reduced, and the optical disk can be used a greater number of times. Also, since the recording starting point can be randomly changed without the use of an analog delay circuit, the production costs of the optical disk driving device can be reduced.

Next, a recording clock generator circuit in accordance with a third embodiment of the present invention will now be described.

This recording clock generator circuit has the same structure as shown in FIGS. 5 and 6, and is used as the recording clock generator circuit 4 in the optical disk driving device shown in FIG. 4. However, the functions of the recording clock generator circuit of this embodiment are different from those of the first and second embodiments.

Address information and a synchronizing signal are modulated and superimposed on a wobble signal on the optical disk 1, on which data recording is to be performed with the recording clock generated by the recording clock generator circuit 4.

A synchronous detector circuit 5 of the recording clock generator circuit 4 detects the synchronizing signal superimposed on the wobble signal, and outputs a wobble synchronizing signal. The address decoder 6, on the other hand, detects the address information superimposed on the wobble signal.

The data encoder 8 modulates recording data in synchronization with a recording clock signal WCK, and inserts the synchronizing signal in the modulated data. The data encoder 8 also outputs an encoder synchronizing signal at the time of inserting the synchronizing signal.

A synchronous detector circuit 11 monitors the timing of the wobble synchronizing signal and the encoder synchronizing signal. In general, when the phase of the wobble signal synchronizes with the phase of the recording clock signal, the timing of the wobble synchronizing signal coincides with the timing of the encoder synchronizing signal. However, if a bit slip occurs in the recording clock generator circuit 4, a phase shift is caused between the wobble signal and the recording clock signal. Accordingly, a timing difference that is equivalent to the bit slip is caused between the wobble synchronizing signal and the encoder synchronizing signal.

In such a case where a timing difference is caused between the wobble synchronizing signal and the encoder synchronizing signal, the synchronous detector circuit 5 changes the frequency dividing condition setting value to be set in the recording clock generator circuit 4 in accordance with the timing difference.

Figure 10:
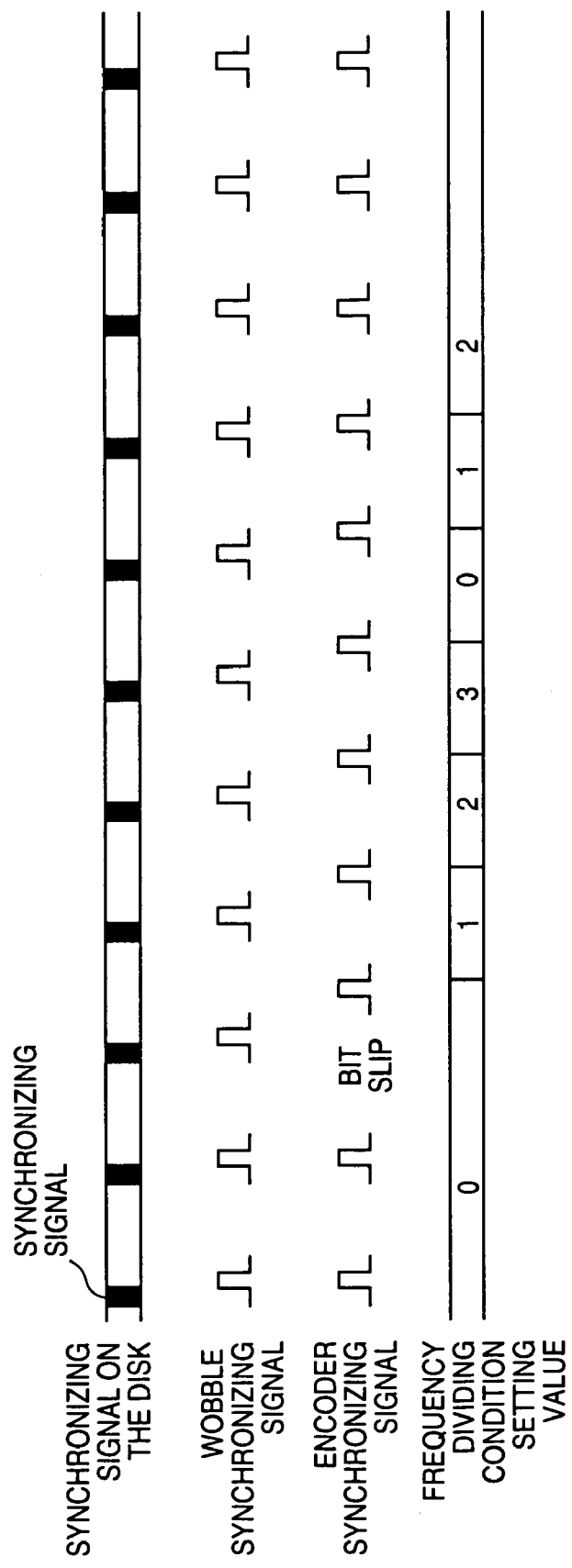
FIG. 10 shows timing charts of various signals in an operation of a synchronous detection circuit in a case where a bit slip occurs in the optical disk driving device of FIG. 4.

FIG. 10 shows timing charts of various signals in an operation of the synchronous detector circuit 5 in a case where a bit slip occurs in the optical disk driving device of FIG. 4.

In FIG. 10, a bit slip occurs between the second synchronizing signal from the left and the third synchronizing signal from the left, and, as a result, a timing difference is caused between the third wobble synchronizing signal from the left and the third encoder synchronizing signal from the left.

Due to the bit slip, the phase of the recording clock is delayed with respect to the wobble signal, and the wobble synchronizing signal is generated ahead of the generation of the encoder synchronizing signal.

In such a situation, the synchronous detector circuit 5 changes the frequency dividing condition setting value so that the phase of the recording clock signal is advanced to compensate the phase lag caused by the bit slip. By doing so, the phase of the recording clock signal can be advanced 0.25T at a time with respect to the wobble signal by increasing the frequency dividing condition setting value in the binary-counter fashion, "0 1 2 3 0 1, . . .".

The synchronous detector circuit 5 continues to change the frequency dividing condition setting value until the timing difference between the wobble synchronizing signal and the encoder synchronizing signal is eliminated. Thus, the phase lag of the recording clock caused by the bit slip can be compensated.

In the above manner, the recording clock generator circuit of this embodiment corrects a phase shift between the wobble signal and the recording clock signal even when a bit slip occurs in the recording clock signal with respect to the wobble signal, and the recording data can be restored at a predetermined location.

Next, a recording clock generator circuit in accordance with a fourth embodiment of the present invention will be described below.

Figure 11:
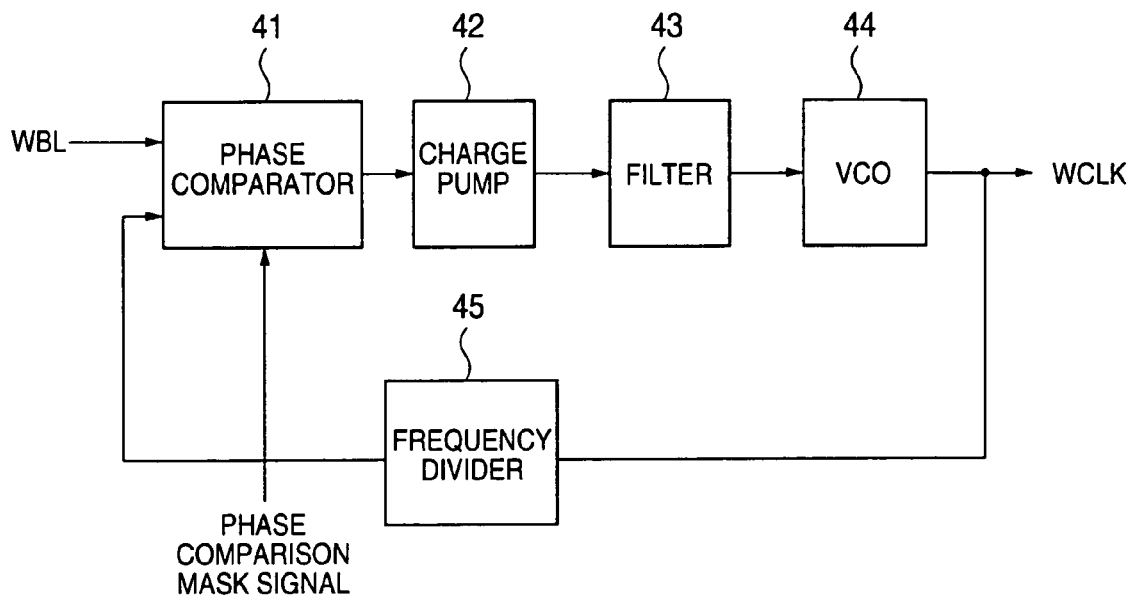
FIG. 11 is a block diagram showing the structure of a recording clock generator circuit in accordance with a fourth embodiment of the present invention.

FIG. 11 is a block diagram showing the structure of the recording clock generator circuit of this embodiment. This recording clock generator circuit has substantially the same structure as the recording clock generator circuit shown in FIG. 3, except that a phase comparison mask signal is inputted into the phase comparator 41. The recording clock generator circuit of this embodiment is also used as the recording clock generator circuit 4 in the optical disk driving device shown in FIG. 4.

Address information and a synchronizing signal are phase-modulated and superimposed on a wobble signal on the optical disk 1, on which data is to be recorded with the recording clock generated by the recording clock generator circuit 4.

Figure 12:
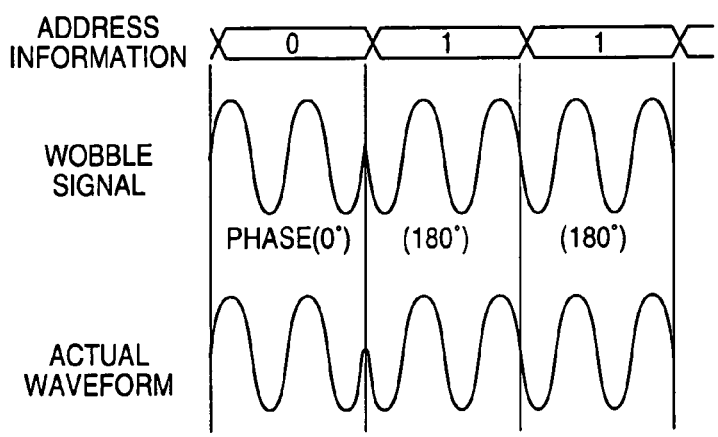
FIG. 12 shows an example waveform of a phase-modulated wobble signal.

FIG. 12 shows an example waveform of a phase-modulated wobble signal.

In the optical disk driving device using the recording clock generator circuit of the fourth embodiment, the synchronous detection circuit 5 detects the synchronizing signal superimposed on the wobble signal, and outputs the phase comparison mask signal to the phase comparator 41 so as to mask detection of the phase difference at any timing close to the timing when the address information or the synchronizing signal is phase-modulated.

Figure 13:
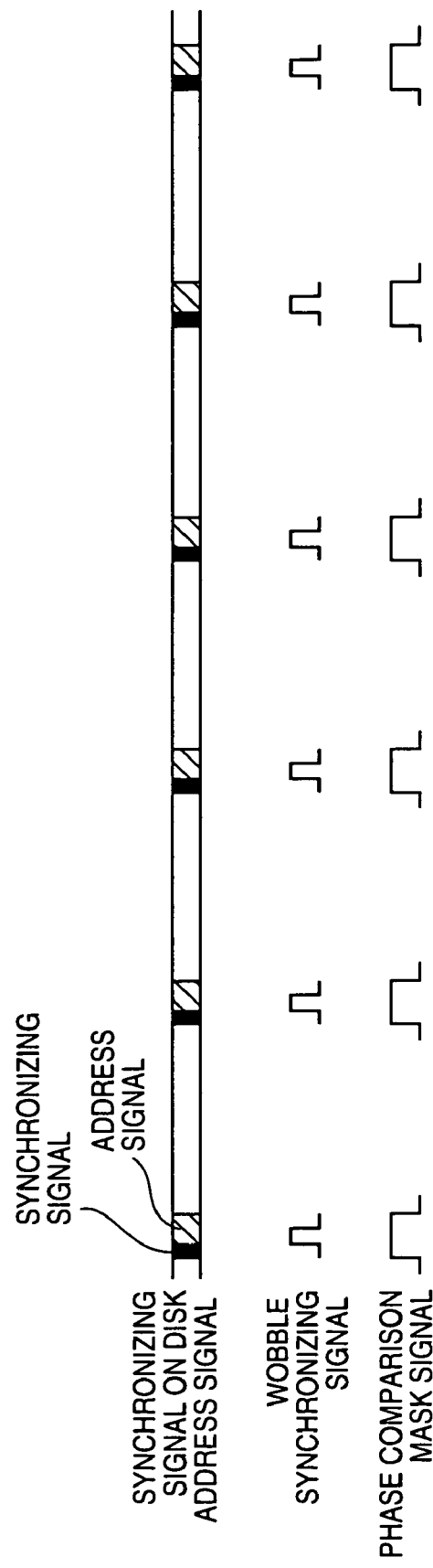
FIG. 13 is a timing chart of the synchronous detection circuit outputting a phase comparison mask signal.

FIG. 13 is a timing chart of the synchronous detection circuit 5 outputting the phase comparison mask signal.

As shown in FIG. 13, the synchronous detection circuit 5 detects the synchronizing signal superimposed on the wobble signal, i.e., the wobble synchronizing signal, and outputs the phase comparison mask signal while the synchronizing signal and an address signal (the detection signal of the address information) are detected. Since the operation of the phase comparator 41 is masked when a drastic change occurs in the phase of the wobble signal due to phase modulation, no phase shift is caused between the wobble signal and the recording clock signal. Thus, a recording clock signal stably synchronous with the wobble signal can be generated by the recording clock generator circuit of this embodiment.

Next, a recording clock generator circuit in accordance with a fifth embodiment of the present invention will be described below.

Figure 14:
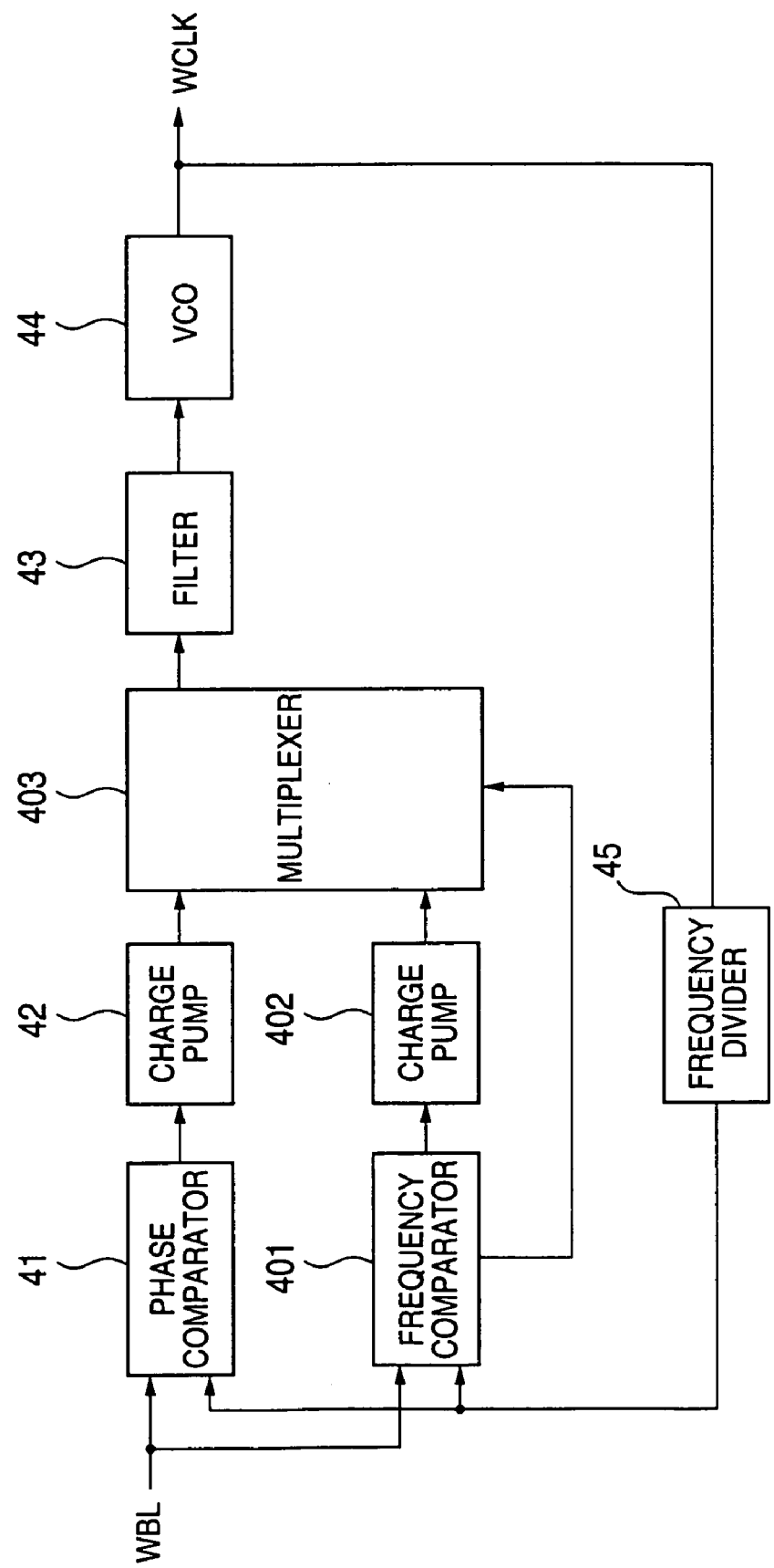
FIG. 14 is a block diagram showing the structure of a recording clock generator circuit in accordance with a fifth embodiment of the present invention.

FIG. 14 is a block diagram showing the structure of the recording clock generator circuit of this embodiment. In this figure, the same components as in FIGS. 3, 5, and 11 are denoted by the same reference numerals. The recording clock generator circuit of this embodiment is also used as the recording clock generator circuit 4 in the optical disk driving device shown in FIG. 4.

In the recording clock generator circuit of this embodiment, a frequency comparator 401 divides the frequency of a wobble signal at a predetermined frequency dividing rate, and counts the cycles of the divided wobble signal by the cycle of the recording clock signal. Based on the count value, the frequency comparator 401 outputs a frequency difference signal to a charge pump 402, and also outputs a switching signal MUX to a multiplexer 403.

The charge pump 402 converts the frequency difference signal into a voltage signal. In accordance with the switching signal MUX transmitted from the frequency comparator 401, the multiplexer 403 selects one of the outputs of the charge pump 42 and the charge pump 402, and outputs the selected output.

Figure 15:
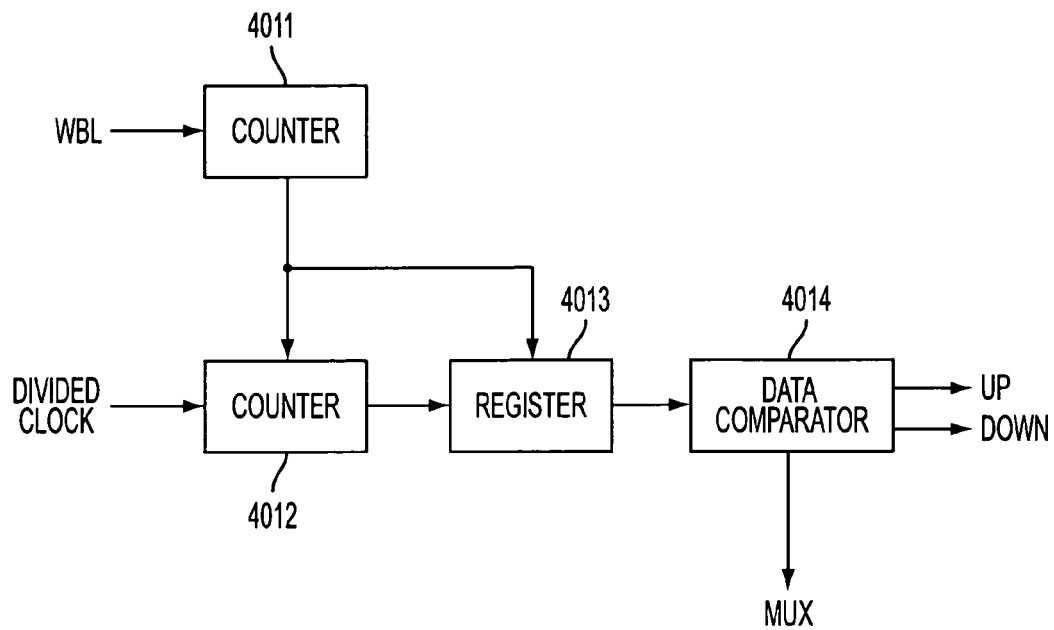
FIG. 15 is a block diagram showing the inner structure of a frequency comparator of the recording clock generator circuit of FIG. 14.

FIG. 15 is a block diagram showing the inner structure of the frequency comparator 401 shown in FIG. 14.

A counter 4011 of the frequency comparator 401 divides the frequency of the wobble signal WBL at the predetermined frequency dividing rate, and outputs the divided wobble pulse to a counter 4012 and a register 4013.

The counter 4012 counts the divided clock, and is reset every time the divided wobble pulse is inputted. The register 4013 is loaded with the count value of the counter 4012 immediately before the counter 4012 is reset by an input of the divided wobble pulse. As a result, the register 4013 is loaded with the value obtained by counting the cycles of the divided wobble signal by the cycle of the recording clock signal. When the divided frequency of the clock signal is lower than the frequency of the wobble signal, the count value is also smaller than the frequency of the wobble signal, and when the divided frequency of the clock signal is higher than the frequency of the wobble signal, the count value is also greater than the frequency of the wobble signal.

A data comparator 4014 outputs a Down signal when the count value of the register 4013 is greater than the predetermined value, and outputs an Up signal when the count value of the register 4013 is smaller than the predetermined value. When the count value of the register 4013 is within a predetermined range, the data comparator 4014 makes the switching signal MUX active so as to select the output of the charge pump 42. When the count value of the register 4013 is outside the predetermined range, the data comparator 4014 makes the switching signal MUX inactive so as to select the output of the charge pump 402.

The above predetermined range is equivalent to the capture range of the PLL circuit. Accordingly, when the relationship between the frequency of the wobble signal and the frequency of the recording clock signal is outside the capture range, a VCO 44 shown in FIG. 14 is driven in accordance with the Up signal or the Down signal outputted from the frequency comparator 401 so that the relationship between the frequency of the wobble signal and the frequency of the recording clock signal moves into the capture range. When the relationship between the frequency of the wobble signal and the frequency of the recording clock signal is within the capture range, the VCO 44 is driven in accordance with the output of the phase comparator 41.

In the above manner, prompt phase locking can be performed with the recording clock generator circuit of this embodiment, even when the relationship between the frequency of the wobble signal and the frequency of the recording signal is outside the capture range.

Next, a recording clock generator circuit in accordance with a sixth embodiment of the present invention will be described below.

The recording clock generator circuit of this embodiment has substantially the same structure as the recording clock generator circuit shown in FIG. 11, except for the inner structure of the frequency comparator 401. This recording clock generator circuit is also used as the recording clock generator circuit 4 in the optical disk driving device shown in FIG. 3.

Figure 16:
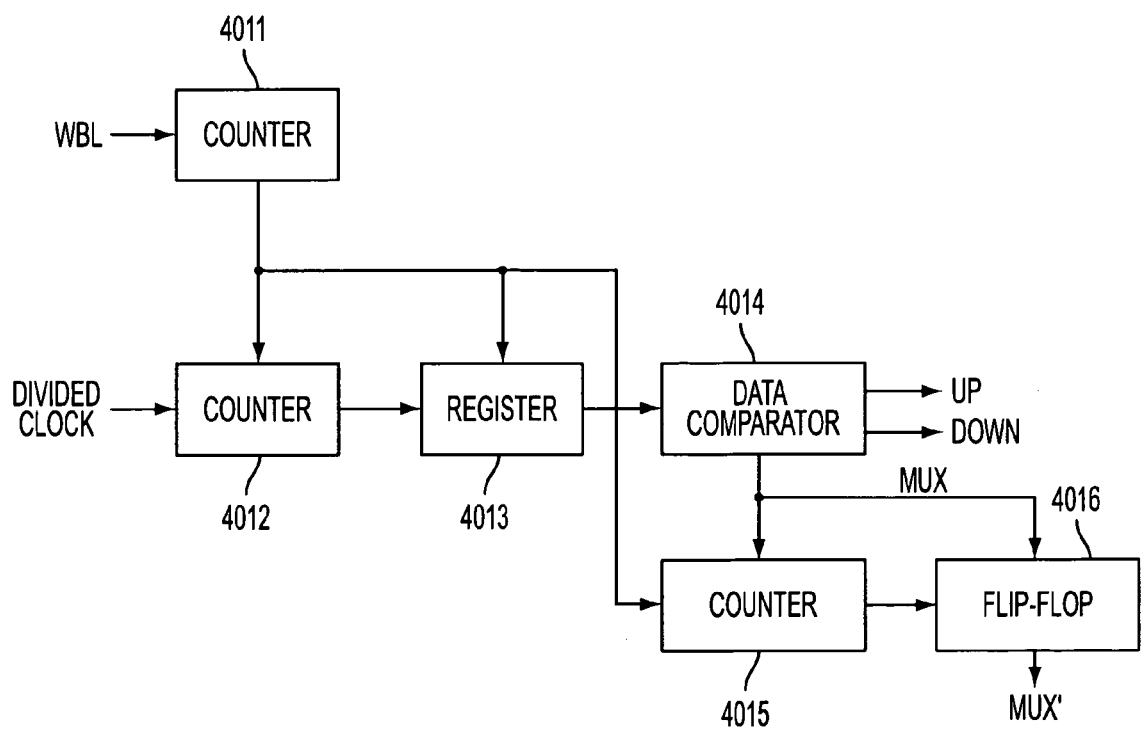
FIG. 16 is a block diagram showing the inner structure of a frequency comparator of a recording clock generator circuit in accordance with a sixth embodiment of the present invention.

FIG. 16 is a block diagram showing the inner structure of the frequency comparator 401 of this embodiment.

This frequency comparator 401 comprises a counter 4015 and a flip-flop 4016, as well as the counter 4011, the counter 4012, the register 4013, and the data comparator 4014, which are also provided in the frequency comparator 401 shown in FIG. 15.

When the count value of the register 4013 is within a predetermined range, the register 4013 makes the switching signal MUX active. As the switching signal MUX is made active, the flip-flop 4016 makes another switching signal MUX', which is the output of the flip-flop 4016 itself, active.

When the count value of the register 4013 is outside the predetermined range, the data comparator 4014 makes the switching signal MUX inactive, but maintains the switching signal MUX' active.

When the switching signal MUX is inactive, the counter 4015 adds "1" to the count value every time the divided wobble pulse is inputted. When the switching signal MUX is active, on the other hand, the counter 4015 resets the count value by the divided wobble pulse. When the above count value reaches the predetermined value, the counter 4015 outputs a reset signal to the flip-flop 4016, and makes the switching signal MUX' inactive. In this manner, the switching signal MUX' can be made inactive, only when the register 4013 is loaded with the count value outside the predetermined range a predetermined consecutive number of times.

Accordingly, the frequency comparator 401 can be prevented from wrongly judging that the relationship between the frequency of the wobble signal and the frequency of the recording clock is outside the capture range, despite that it is in fact within the capture range.

As described so far, with the recording clock generator circuit of this embodiment, prompt phase locking can be performed, even when the relationship between the frequency of the wobble signal and the frequency of the recording clock signal is outside the capture range. Also, an unnecessary phase pull-in operation can be avoided while the PLL is locked.

The present invention is not limited to the specifically disclosed embodiments, but variations and modifications may be made without departing from the scope of the present invention.

The present invention is based on Japanese priority application No. 11-207997, filed on Jul. 22, 1999, the entire contents of which are hereby incorporated by reference.

What is claimed is:

1. A data recording clock signal generator that generates a recording clock signal synchronous with a wobble signal used for recording data on an optical disk having a data recording track wobbled by the wobble signal having predetermined frequency components, said data recording clock generator comprising:
a wobble signal extracting unit that extracts the wobble signal;
a recording clock signal dividing unit that generates a divided clock signal obtained by dividing the frequency of the recording clock signal;
a phase difference signal generating unit that generates a phase difference signal as a result of phase comparison between the wobble signal and the divided clock signal;
a frequency control signal generating unit that generates a frequency control signal based on the phase difference signal generated by the phase difference signal generating unit; and
a recording clock signal generating unit that generates the recording clock signal having a frequency controlled in accordance with the frequency control signal generated by the frequency control signal generator,
wherein
the recording clock signal dividing unit is provided with a frequency dividing rate setting unit that sets, in accordance with predetermined procedures, a reference frequency dividing rate and a frequency dividing rate different from the reference frequency dividing rate by which the frequency of the recording clock signal is divided, and
wherein a time period, over which the frequency dividing rate different from the reference frequency dividing rate is set, is set shorter than an operating time constant of the frequency dividing rate setting unit.

2. A data recording clock signal generator that generates a recording clock signal synchronous with a wobble signal used for recording data on an optical disk having a data recording track wobbled by the wobble signal having predetermined frequency components, said data recording clock generator comprising:
a wobble signal extracting unit that extracts the wobble signal;
a recording clock signal dividing unit that generates a divided clock signal obtained by dividing the frequency of the recording clock signal;
a phase difference signal generating unit that generates a phase difference signal as a result of phase comparison between the wobble signal and the divided clock signal;
a frequency control signal generating unit that generates a frequency control signal based on the phase difference signal generated by the phase difference signal generating unit; and
a recording clock signal generating unit that generates the recording clock signal having a frequency controlled in accordance with the frequency control signal generated by the frequency control signal generator,
wherein the recording clock signal dividing unit is provided with a frequency dividing rate setting unit that sets a reference frequency dividing rate by which the frequency of the recording clock signal is divided and a frequency dividing rate different from the reference frequency dividing rate, following predetermined procedures, and wherein
the frequency dividing rate setting unit is provided with a rate selecting unit that changes an order of combination of the reference frequency dividing rate and the different frequency dividing rate every time data recording is performed on the optical disk.

3. A data recording clock signal generator that generates a recording clock signal synchronous with a wobble signal used for recording data on an optical disk having a data recording track wobbled by the wobble signal having predetermined frequency components, said data recording clock generator comprising:
a wobble signal extracting unit that extracts the wobble signal;
a recording clock signal dividing unit that generates a divided clock signal obtained by dividing the frequency of the recording clock signal;
a phase difference signal generating unit that generates a phase difference signal as a result of phase comparison between the wobble signal and the divided clock signal;
a frequency control signal generating unit that generates a frequency control signal based on the phase difference signal generated by the phase difference signal generating unit;
a recording clock signal generating unit that generates the recording clock signal having a frequency controlled in accordance with the frequency control signal generated by the frequency control signal generator, wherein the recording clock signal dividing unit is provided with a frequency dividing rate setting unit that sets a reference frequency dividing rate by which the frequency of the recording clock signal is divided and a frequency dividing rate different from the reference frequency dividing rate, following predetermined procedures;
a synchronous detection unit that detects a synchronizing signal superimposed on the wobble signal;
a synchronous relationship judgment unit that judges the synchronous relationship between the detected synchronizing signal and recording data to be recorded on the optical disk; and
a control unit that controls an average value of the frequency dividing rate set in the recording clock dividing unit to be greater than the reference frequency dividing rate when the synchronous relationship judgment unit judges that the recording data lags behind the detected synchronizing signal, and also controls the average value of the frequency dividing rate to be smaller than the reference frequency dividing rate when the synchronous relationship judgment unit judges that the recording data is ahead of the detected synchronizing signal.

4. A data recording clock signal generator that generates a recording clock signal synchronous with a wobble signal used for recording data on an optical disk having a data recording track wobbled by the wobble signal, which has predetermined frequency components, and on which address information and a synchronizing signal are phase-modulated and superimposed, a groove of the data recording track being formed on the optical disk in a phase-modulated manner, said data recording clock signal generator comprises:
a wobble signal extracting unit that extracts the wobble signal;
a recording clock signal dividing unit that generates a divided clock signal obtained by dividing a frequency of the recording clock signal;
a phase difference signal generating unit that generates a phase difference signal as a result of a phase comparison between the wobble signal and the divided clock signal;
a frequency control signal generating unit that generates a frequency control signal based on the phase difference signal generated by the phase difference signal generating unit;

a recording clock signal generating unit that generates the recording clock signal having a frequency controlled in accordance with the frequency control signal generated by the frequency control signal generating unit; and a masking unit that generates a phase comparison mask signal to prevent the phase difference signal generating unit from generating the phase difference signal, said mask signal being generated at a portion of the wobble signal on which either the address information or the synchronizing signal is phase modulated and superimposed on the optical disk.

5. A data recording clock signal generator that generates a recording clock signal synchronous with a wobble signal used for recording data on an optical disk having a data recording track wobbled by the wobble signal having predetermined frequency components, said data recording clock signal generator comprising:

a wobble signal extracting unit that extracts the wobble signal;

a recording clock signal dividing unit that generates a divided clock signal obtained by dividing a frequency of the recording clock signal;

a phase difference signal generating unit that generates a phase difference signal as a result of a phase comparison between the wobble signal and the divided clock signal;

a first frequency control signal generating unit that generates a first frequency control signal based on the phase difference signal generated by the phase difference signal generating unit;

a wobble signal dividing unit that divides a frequency of the wobble signal at a predetermined frequency dividing rate;

a wobble signal cycle counting unit that counts cycles of the divided wobble signal by the cycle of the recording clock signal;

a second frequency control signal generating unit that generates a second frequency control signal based on the number of cycles counted by the wobble signal cycle counting unit; and a recording clock signal generating unit that generates the recording clock signal having a frequency controlled in accordance with the first frequency control signal when the number of cycles counted by the wobble signal cycle counting unit is within a predetermined range, and generates the recording clock signal having a frequency controlled in accordance with the second frequency control signal when the number of cycles counted by the wobble signal cycle counting unit is outside the predetermined range.

6. The data recording clock signal generator as claimed in claim 5, wherein the recording clock signal generating unit generates the recording clock signal having the frequency controlled in accordance with the first frequency control signal when the number of cycles counted by the wobble signal cycle counting unit is within the predetermined range, and generates the recording clock signal having the frequency controlled in accordance with the second frequency control signal when the number of cycles counted by the wobble signal cycle counting unit is determined to be outside the predetermined range a predetermined consecutive number of times.

* * * * *